(12) United States Patent
Mondin et al.

(10) Patent No.: US 10,931,181 B2
(45) Date of Patent: Feb. 23, 2021

(54) PROCESS FOR MANUFACTURING A WATERPROOF MAGNETO-ROTOR MADE OF RARE-EARTH ELEMENTS

(71) Applicant: Taco Italia S.r.l., Sandrigo (IT)

(72) Inventors: Roberto Mondin, Paese (IT); Marco Melison, Vicenza (IT)

(73) Assignee: Taco Italia S.r.l.

( * ) Notice: Subject to any disclaimer, the term of this patent is extended or adjusted under 35 U.S.C. 154(b) by 274 days.

(21) Appl. No.: 15/965,051

(22) Filed: Apr. 27, 2018

(65) Prior Publication Data
US 2018/0316252 A1    Nov. 1, 2018

(30) Foreign Application Priority Data

Apr. 27, 2017    (IT) .......................... 102017000045959

(51) Int. Cl.
| | | |
|---|---|---|
| *H02K 15/02* | (2006.01) | |
| *H02K 15/03* | (2006.01) | |
| *H02K 1/02* | (2006.01) | |
| *B29C 45/14* | (2006.01) | |
| *H02K 5/10* | (2006.01) | |
| *H02K 15/12* | (2006.01) | |

(Continued)

(52) U.S. Cl.
CPC ....... *H02K 15/03* (2013.01); *B29C 45/14639* (2013.01); *H02K 1/02* (2013.01); *H02K 1/2753* (2013.01); *H02K 5/10* (2013.01); *H02K 15/12* (2013.01); *B29L 2031/34* (2013.01); *H02K 1/2733* (2013.01); *Y10T 29/49012* (2015.01)

(58) Field of Classification Search
CPC .......... H02K 15/03; H02K 5/08; H02K 1/276; H02K 21/185; H02K 1/2733; H02K 1/28; Y10T 29/49002; Y10T 29/49009; Y10T 29/49012; B29L 2031/7498; F03B 17/061
USPC ................................. 29/598, 596, 607, 732
See application file for complete search history.

(56) References Cited

U.S. PATENT DOCUMENTS 4,414,523 A * 11/1983 Pieters .................. H01F 7/0221
                                                335/302
4,613,289 A    9/1986 Kotera
(Continued)

FOREIGN PATENT DOCUMENTS

| EP | 1039615 A1 | 9/2000 |
|---|---|---|
| EP | 1427087 A1 | 6/2004 |

*Primary Examiner* — Thiem D Phan
(74) *Attorney, Agent, or Firm* — Sutton Magidoff Barkume LLP

(57) ABSTRACT

The invention relates to a process for manufacturing a waterproof magneto-rotor (1) made of rare-earth elements, to be used in a synchronous electric motor having a rotor (2) with a permanent magnet and wherein the rotor (2) is solidly fixed to a shaft (3). The process comprises the following phases:
 a first phase of coating the rotor (2) with a first inner protective layer (12) obtained by a first injection moulding phase;
 a second phase of coating the first inner protective layer (12) of the rotor (2) with a second outer protective layer (14) obtained by a second injection moulding phase;
 at least one annular protective barrier (15) being shaped on at least one or both the opposed end surfaces of the rotor (2) during the first injection moulding phase, for preventing water or humidity from seeping between the first inner protective layer (12) and the second outer protective layer (14).

11 Claims, 4 Drawing Sheets

(51) Int. Cl.
*H02K 1/27* (2006.01)
*B29L 31/34* (2006.01)

(56) References Cited

U.S. PATENT DOCUMENTS

| | | | | |
|---|---|---|---|---|
| 6,007,312 A | * | 12/1999 | Pieters | F04D 13/022 29/607 |
| 9,178,394 B2 | * | 11/2015 | Asahi | H02K 1/04 |
| 10,199,901 B2 | * | 2/2019 | Ehrsam | F04D 13/06 |

* cited by examiner

PROCESS FOR MANUFACTURING A WATERPROOF MAGNETO-ROTOR MADE OF RARE-EARTH ELEMENTS

FIELD OF APPLICATION

The present invention relates to a process for manufacturing a waterproof magneto-rotor made of rare-earth elements, to be used in a synchronous electric motor having a rotor with a permanent magnet and the following description is made with reference to the field of application of the motor-pumps with the sole objective of simplifying the exposition thereof.

It is well-known that motor-pumps generally known by the term circulator are employed for the circulation of the carrier fluid in the heating systems.

It is also known in this technical field that a circulator generally comprises a synchronous electric motor, whose rotor is fitted on a shaft having an end kinematically coupled to an impeller driven by the electric motor itself.

PRIOR ART

In the type of motor-pumps for fluids involved in the present invention, motor-pumps are known wherein the electric motor is of the synchronous type and the permanent magnet rotor is housed in a hollow body made of plastic material, referred to as tube, within a stator pack with associated windings.

The rotor is integral with a shaft.

The pack with the windings is separated and insulated from the hollow body to ensure electrical insulation, but the rotor is housed in the tube within the stator pack so that it can be easily removed to allow an easy assembling and a possible extraction for maintenance thereof.

The shaft with the rotor is supported on the rotating side by a bearing with interposition of a thrust-bearing disc made of a hard and abrasion-resistant material and on the opposite side by supporting bushings made of anti-friction material.

The latest generation rotors are no longer made of monolithic permanent magnets but of synthesis products formed by means of pastes of ferromagnetic material.

With the development of technology there is a need to increase the performance of the motor-pumps in terms of hydraulic power and therefore of the Q/h curve (flow per hour) given equal size and structure of the pump. One would say given an equal production cost.

A possible solution is to use a rotor with permanent magnet with higher performance in terms of magnetic flux.

This would be possible nowadays by using high performance alloys based on the so-called rare-earth elements, for example NEODYMIUM (which is a Neodymium-Iron-Boron alloy) or a similar Samarium-Cobalt alloy.

These alloys would replace traditional magnets made of Ferrite for example.

However, these alloys of ferromagnetic materials are so sensitive to the contact with water because they naturally tend to lose their magnetic features if the rotor of the pump is submerged in water or anyway in contact with water.

The fact that it is housed in the plastic tube does not offer enough guarantee that the rotor can be adequately protected from the contact with water or humidity.

The technical problem underlying the present invention is that of conceiving a process having functional features such as to enable a magneto-rotor to be manufactured on an industrial scale, which incorporates a magnet of an alloy of rare-earth elements, which is rendered watertight and deprived of contact with humidity.

Another objective of the invention is to provide a magneto-rotor made of a watertight alloy of rare-earth elements, no matter the subsequent processing or process phases the rotor must undergo.

A further objective of the invention is to provide a magneto-rotor made of a watertight alloy of rare-earth elements having relatively low production costs.

SUMMARY OF THE INVENTION

The solution idea underlying the present invention is to provide in sequence a first and a second moulding process of a respective shell of said magneto-rotor in order to obtain a completely coated and watertight magnet.

Based upon this solution idea the technical problem is solved by a process for manufacturing a waterproof magneto-rotor made of rare-earth elements, to be used in a synchronous electric motor having a rotor with a permanent magnet and wherein the rotor is solidly fixed to a shaft, characterized in that it provides:

a first phase of coating the rotor with a first inner protective layer obtained by a first injection moulding phase;

a second phase of coating the inner first protective layer of the rotor with a second outer protective layer obtained by a second injection moulding phase;

at least one annular protective barrier being shaped on at least one of the opposed end surfaces of the rotor during the first injection moulding phase, for preventing water or humidity from seeping between the first inner protective layer and the second outer protective layer.

Preferably, the at least one annular protective barrier provides sealing by fusion of injection moulding material, between the first inner protective layer and the second outer protective layer.

Preferably, the above-mentioned annular barrier is shaped on both the opposed end surfaces of the rotor during the first moulding phase.

Advantageously, further, said protective barrier is formed by means of at least one couple of concentric annular rims formed as a single piece with said first inner protective layer.

It should be noticed that the annular rims have a substantially triangular tapered section towards the outside.

The second outer protective layer covers both the concentric annular rims, sealing the space in therebetween, preventing water or humidity from seeping between the two protective layers.

Further, the first moulding phase is carried out in a mould wherein the rotor having a cylindrical inner duct is kept coaxial with the shaft in a prefixed distanced relation.

The first moulding phase provides the resin injection of the first inner protective layer also in the interstice between said duct of the rotor and the supporting shaft.

Further, the first moulding phase provides the formation of a collar which is adherent to the shaft on the side where the shaft protrudes most out of the rotor. The second moulding phase provides the covering of said collar with said second outer protective layer and the formation of an annular seat for receiving a thrust bearing. Advantageously, the second moulding phase provides a film injection on the entire diameter of the side of the rotor where the shaft protrudes most out of the rotor.

The features and advantages of the process and the magneto-rotor according to the present invention will be apparent from a description thereof, made hereinafter, of an embodiment given by way of indicative and non-limiting example, with reference to the accompanying drawings.

DETAILED DESCRIPTION OF THE INVENTION

Figure 1:
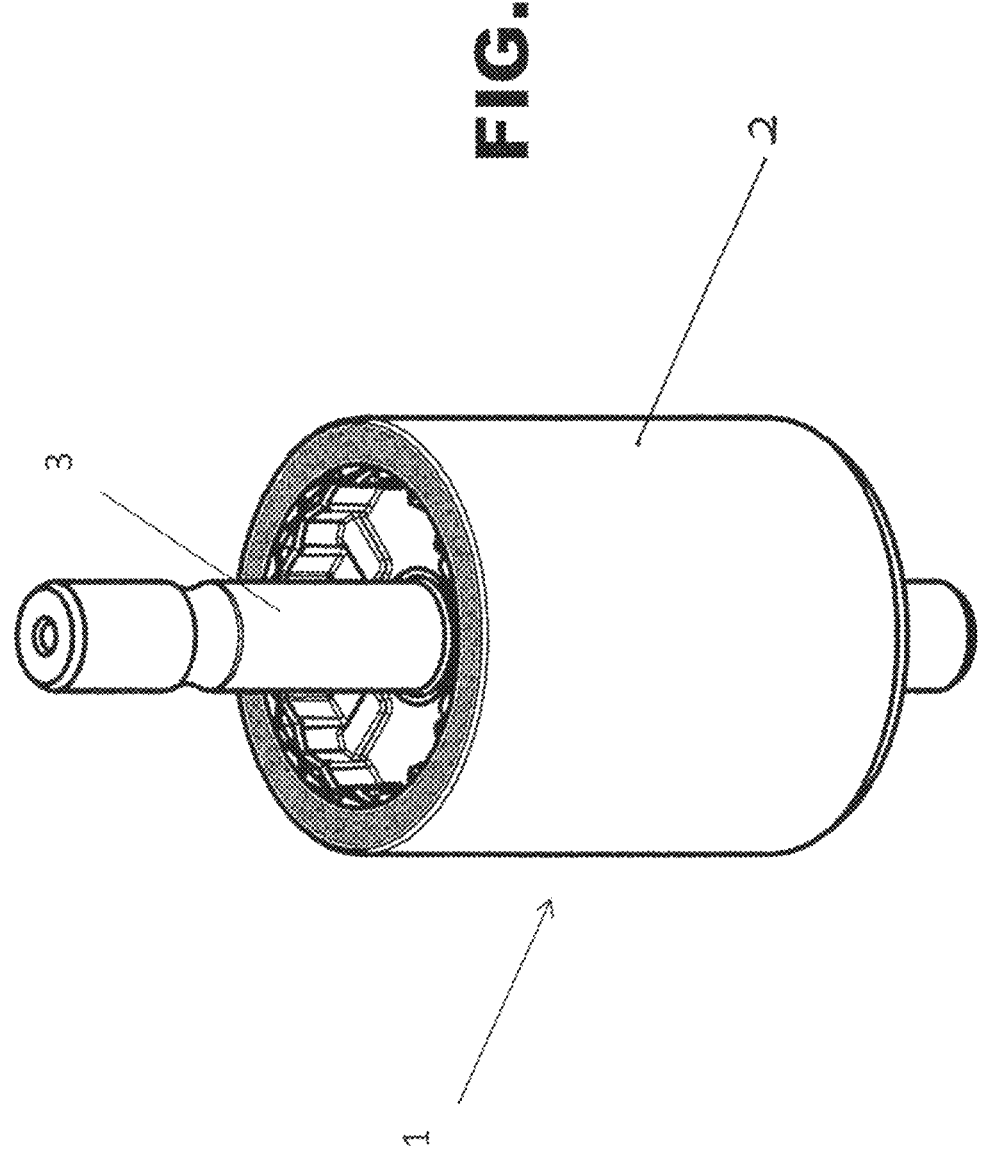
FIG. 1 shows a perspective and schematic view of a magneto-rotor manufactured according to the process of the present invention to be incorporated in a synchronous electric motor.

With reference to such figures, and in particular to the example of FIG. 1, a magneto-rotor with permanent magnet manufactured according to the process of the present invention is globally and schematically indicated by 1.

Magneto-rotor 1 is to be understood as the combination of a permanent magnet rotor 2 with a drive shaft 3 of a synchronous electric motor.

The electric motor is not represented in the drawings since it is conventional; however, an electric motor incorporating a magneto-rotor such as the one described below can be identified in the patent application Ser. No. 15/673,879, of the same Applicant.

The rotor 2 is advantageously provided by means of an alloy of so-called rare-earth elements, that is to say an alloy of particles or powders of ferromagnetic material which are made adhere to each other by means of a sintering phase.

The alloys of rare-earth elements which can be used for the rotor 2 can be NEODYMIUM for example, a Neodymium-Iron-Boron alloy, or a similar Samarium-Cobalt alloy.

In the following description we will refer to the rotor 2 as a substantially cylindrical sleeve. Essentially, the rotor 2 is obtained by sintering the rare-earth elements powders for example by means of a sintering process, which however lies outside the process of the present invention.

The rotor 2 has a cylindrical inner duct 4 with prefixed diameter, slightly greater than the outer diameter of the shaft 3. The rotor 2 can then be inserted on the shaft 3 to undergo the first processing phase of the process according to the present invention.

As stated above, the idea underlying the present invention is that of completely winding the magnet of the rotor 2 through an over-moulding process with a plastic material.

A first injection moulding phase by means of a plastic material 5 allows making the rotor 2 coaxially integral with the shaft 3. This first injection moulding phase will be referred to as over-moulding.

This over-moulding takes place for example by injection of an epoxy resin, for example a PPS GF40 resin resistant to hydrolysis, in a dedicated mould containing the shaft 3 and the rotor 2.

The rotor 2 and the shaft 3 are made coaxial to each other maintaining the inner duct 4 of the rotor 2 in a prefixed distanced relation with the shaft 3 by means of some supporting pins (not shown in the drawings) present in the dedicated mould and supporting the rotor 2 from opposite sides, in particular the pins contact the opposed end surfaces 8, 9 of the rotor 2.

More particularly, even though it is not visible, it will be clear to a skilled person that a mould used in this first phase of the process will allow an axial centering of the rotor 2 around the shaft 3 when these components are positioned within the mould itself.

Figure 2:
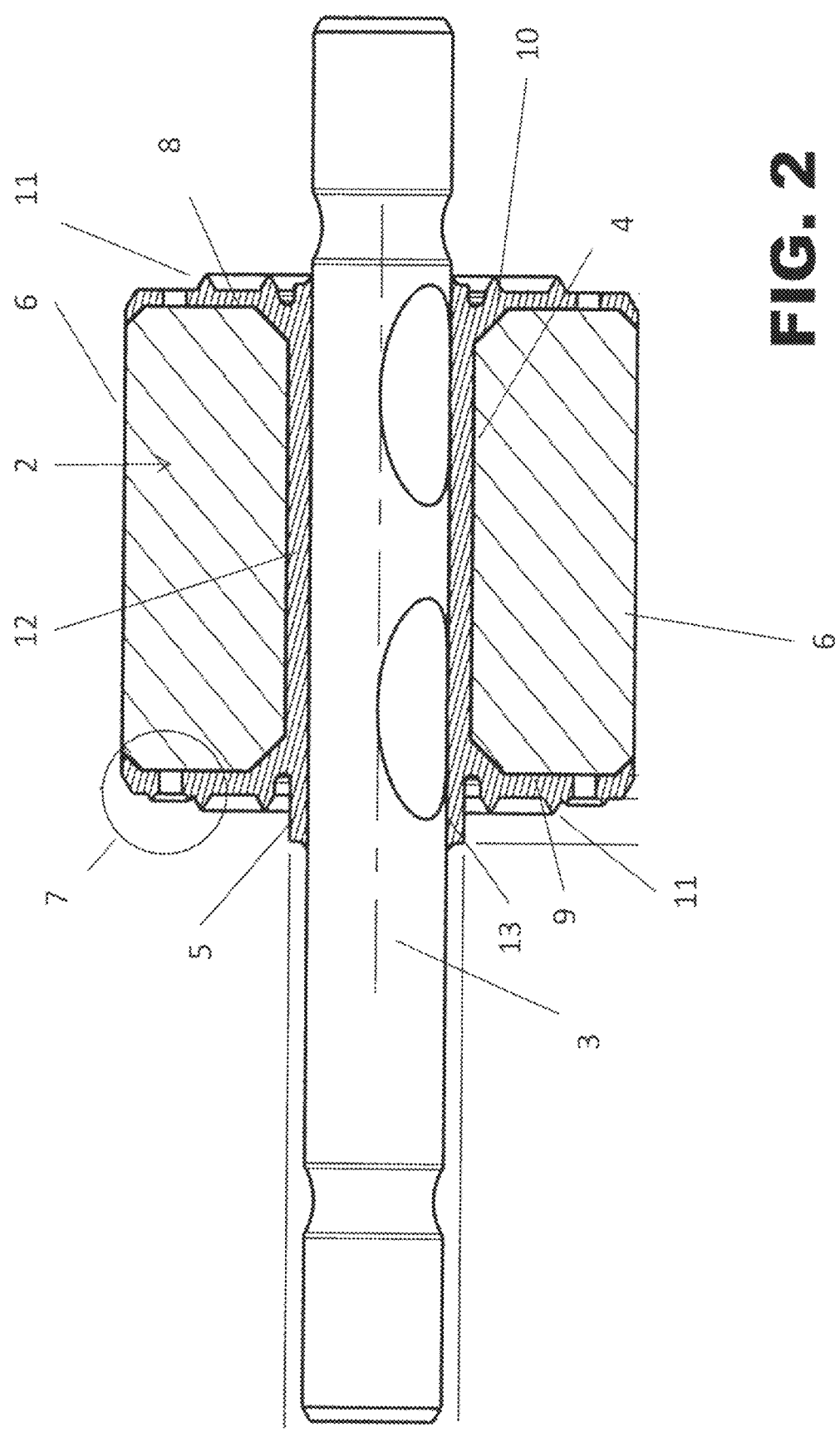
FIG. 2 shows a longitudinal sectional view of the magneto-rotor of FIG. 1 in a first phase of the process according to the invention for the manufacturing thereof.

As clearly shown in FIG. 2, the plastic material 5 is melted in the above-mentioned mould and permeates all the clearances and interstices between the rotor 2 and the shaft 3 forming a first inner protective layer 12.

The layer 12 is elongated along the shaft 3 from the part of the surface 9 of the rotor 2 to form a collar 13 which is adherent to the shaft 3.

Obviously, the first moulding phase provides the resin injection of the first inner protective layer 12 also in the interstice between said duct 4 of the rotor and the supporting shaft 3.

Following this first processing phase it is clear from the figures how the rotor magnet 2 is still exposed to the surrounding environment both on its outer cylindrical surface 6 and in some areas 7 or openings such as those highlighted in the upper left circle in FIG. 2.

These openings 7 are residual traces of the supporting pins present in the mould during the first over-moulding phase.

Advantageously, according to the invention, a second injection moulding phase, namely over-moulding phase, is provided to completely coat the areas 7 and the surfaces 6 still exposed of the rotor 2, forming a second outer protective layer 14 so as to completely protect the magnet by coating it with a waterproof shell formed by a double watertight protective layer.

Figure 3:
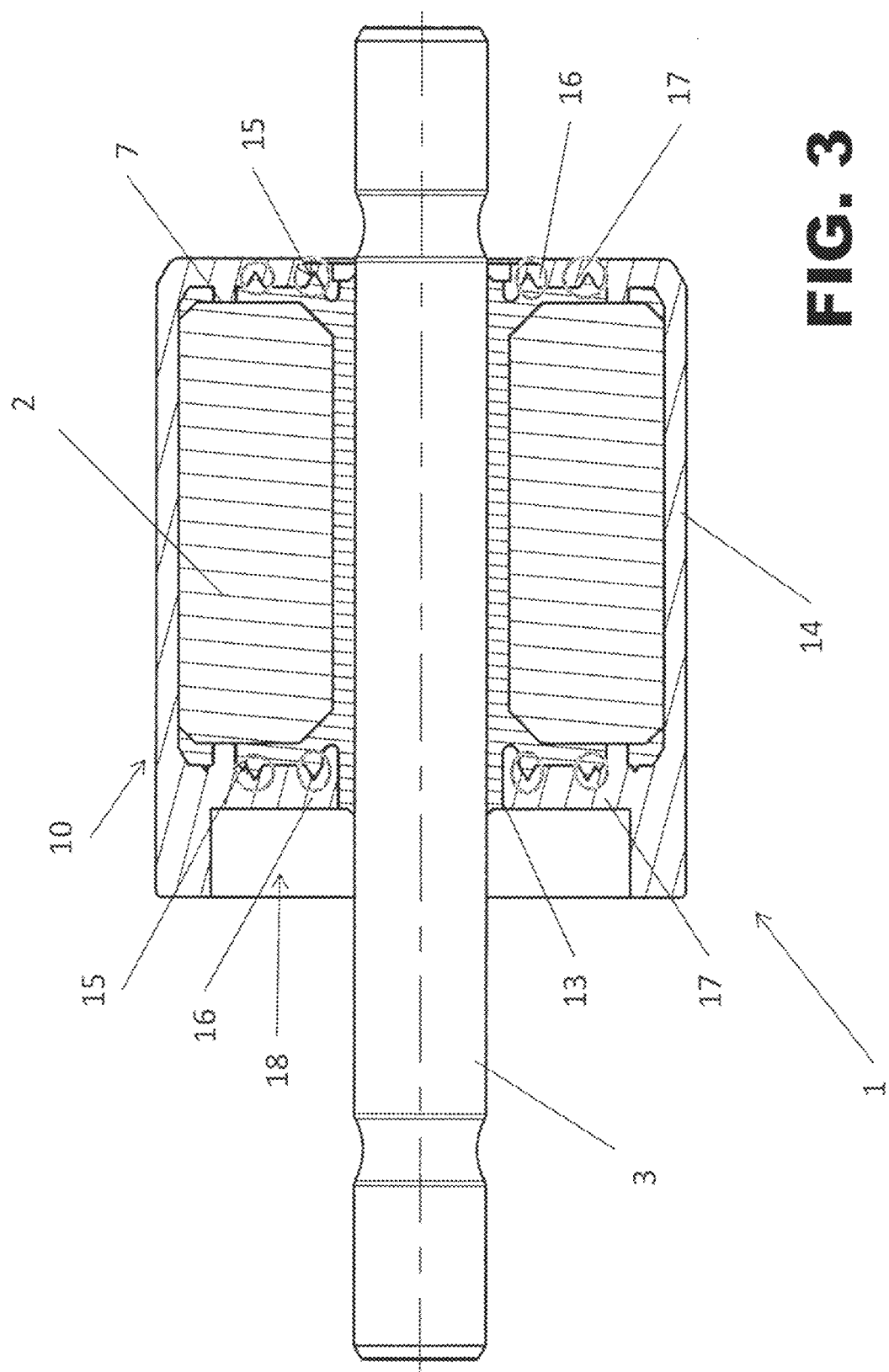
FIG. 3 shows a longitudinal sectional view of the magneto-rotor of FIG. 1 in a subsequent phase of the process according to the invention, in particular to underline details of the areas wherein sealing via fusion takes place.
Figure 4:
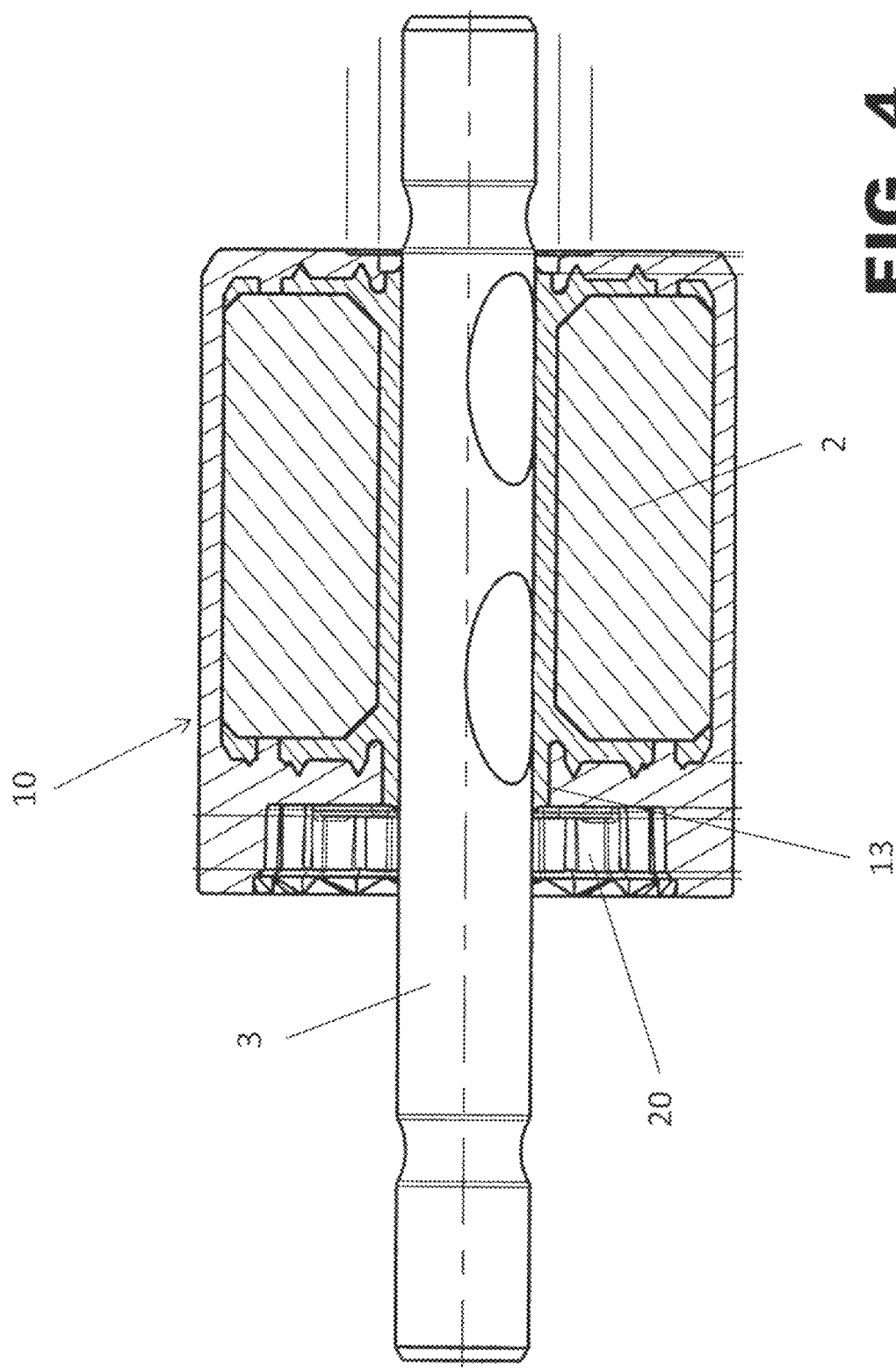
FIG. 4 shows a longitudinal sectional view of the magneto-rotor of FIG. 1 at the end of the processing provided by the process according to the invention.

In FIG. 3 the result of this second over-moulding phase is schematically shown, and in particular the details are highlighted of the areas where a sealing via fusion takes place. This second over-moulding phase is carried out in a dedicated mould, different from the previous one, since the rotor was already made coaxial with the shaft during the previous over-moulding phase.

Given the configuration itself of the second mould from the side of the rotor 2 wherein the shaft 3 is protruding most, an annular seat 18 is obtained for receiving a thrust bearing. This seat 18 is obtained in the second outer protective layer 14 made of plastic material.

In FIG. 3 it is possible to notice how the second over-moulding phase has completely covered both the external cylindrical surface 6 and the openings 7 left free from the presence of the supporting/centering pins of the first over-moulding phase.

At this stage the magnet of the rotor 2 is from a geometric point of view completely enveloped by a double protective layer 10 which forms a sort of double waterproof shell which makes it ideally protected from water or humidity. As a result, the annular protective barrier 15 provides sealing by fusion of injection moulding material between the first inner protective layer 12 and the second outer protective layer 14.

This double shell 10 obtained by the two distinct over-moulding phases, if submerged in water, could still allow water to seep between the two protective layers 12, 14 of plastic material until it reaches the magnet and potentially damages it.

Advantageously, the present invention also finds a solution to this remote possibility by providing a structural barrier to possible see pages between the two protective layers.

Such a barrier is obtained by at least one annular rim 15 obtained on at least one first inner protective layer 12 deposited over one of the end surfaces 8 or 9 of the rotor 2.

Preferably, but not necessarily, this at least one annular rim 15 is obtained on each first inner protective layer 12 over both the opposed end surfaces 8 or 9 of the rotor 2.

More particularly, this rim 15 is preferably already formed directly in the first inner protective layer 12 obtained by the first over-moulding phase.

Obviously, the skilled person can appreciate that the rim 15 can be formed on the opposed end surfaces 8 or 9 of the rotor 2 even before carrying out the first over-moulding phase. In this case the over-moulding would possibly make the thickness of the rim 15 greater.

However, forming the rim 15 in the first over-moulding protective layer 12 has the advantage of providing a simple configuration of the mould, wherein this first over-moulding phase is carried out with formation of the rim 15 itself.

In an alternative but preferred embodiment, the above-mentioned barrier is formed by a couple of concentric annular rims 16, 17.

Even in this case it is preferable to obtain such rims 16, 17 directly in the first inner protective layer obtained with the first over-moulding phase.

Advantageously, during the second over-moulding phase the second outer protective layer 14 covers both the annular rims 16, 17, substantially sealing by means of this second outer layer of plastic material the space interposed between the concentric rims so as to prevent water from seeping between the two protective layers 12, 14 that have been welded together.

More in detail, the concentric annular rims 16 and 17 have a tapered section towards the outside as shown in FIG. 3. Such section can be also defined triangular within the limits of the surface irregularities that this type of processing involves.

The triangular shape of the rims 16, 17, being tapered, has a lower thickness towards the vertex and when it is hit by the plastic material at high temperature and high pressure coming from the second over-moulding, it overheats until it melts and ensures complete cohesion between the two protective plastic layers.

The two mouldings are carried out within a short period of time from each other to avoid the complete cooling of the component after the first moulding and to facilitate cohesion between the two materials.

Since the rims 16 and 17 are substantially concentric annular projections, they form 360° complete beads which interrupt the possible seepage of water.

In order to make the fusion process of the rims even more homogeneous, the second injection phase is performed in films on the entire outer ring gear as shown by the schematic illustration of the finished product shown in FIG. 1.

The invention successfully solves the technical problem and achieves numerous advantages shown hereinafter.

For the functionality of the rotor, that is to say for the correct assembling of the magnet on the shaft of the motor, it is necessary that the assembly is solid, structurally and mechanically precise and balanced. This entails that the first over-moulding phase provides for the supporting pins which allow the magnet to be coaxially fixed to the shaft during the moulding phase.

Also for the functionality it is necessary that the magnet does not contact water, that means that the magnet shall be completely covered in plastic material, in particular in the interface between the two mouldings.

The second over-moulding phase, to prevent the passage of humidity, must not have irregularities such as abnormal seams, flaws or other. Therefore, the most critical points for the passage of humidity are the two end surfaces 8 and 9 of the rotor 2.

In order to ensure cohesion between the plastic material of the first and the second over-moulding, the rims 15 have been specifically provided, which are formed during the first over-moulding phase.

During the second over-moulding phase these rims melt at least partially so as to ensure an interface of homogeneous material which prevents the passage of humidity.

The centering pins used in the first moulding phase are positioned externally with respect to both the rims 16 and 17 so as to have more space available to form the rims. This makes it possible to create rims 16 and 17 which form two concentric circles and thus to have two barriers to the entry of humidity.

The second over-moulding phase provides a film injection on the entire diameter of the side of the rotor wherein the shaft 3 is protruding most, and this also entails that the interface located on the opposite side of the second outer protective layer 14, that is to say on the side on the surface 8, melts under the best conditions and that irregularities are not formed such as abnormal seams or flaws on the protective shell 10.

Further, the process according to the invention has the advantage of being easily implemented at definitely low costs.

The following invention is claimed:

1. A process for manufacturing a waterproof magneto-rotor made of rare-earth elements, to be used in a synchronous electric motor having a rotor with a permanent magnet and wherein the rotor is solidly fixed to a shaft comprising:
   a first phase of coating the rotor with a first inner protective layer obtained by a first injection molding phase;
   a second phase of coating the first inner protective layer of the rotor with a second outer protective layer obtained by a second injection molding phase;
   a pair of annular protective barriers being shaped as concentric annular rims, formed in one piece in said first inner protective layer on both of the opposed end surfaces of the rotor to provide sealing by fusion of injection molding material during the first injection molding phase, such that concentric annular rims are formed in one piece in said first inner protective layer, wherein said second outer protective layer covers both the concentric annular rims, sealing the space therebetween, for preventing water or humidity from seeping between the first inner protective layer and the second outer protective layer.

2. The process according to claim 1, wherein said concentric annular rims have a substantially tapered section towards the outside.

3. The process according to claim 1, said second outer protective layer covers both the concentric annular rims, sealing the space in therebetween, preventing water or humidity from seeping between the two protective layers.

4. The process according to claim 3, wherein said concentric annular rims have a substantially tapered section towards the outside.

5. The process according to claim 1, wherein said first phase of coating the rotor with said first inner protective layer makes said rotor coaxially integral with said shaft.

6. The process according to claim 5, wherein said first injection molding phase is performed in a mold wherein the rotor having a cylindrical internal duct is kept coaxial to the shaft in a prefixed distanced relation.

7. The process according to claim 6, wherein said first injection molding phase provides for resin injection of the first inner protective layer also into the interstice between said duct of the rotor and the supporting shaft.

8. The process according to claim 5, wherein said first injection molding phase provides for the shaping of a collar which is adherent to the shaft on the side where the shaft protrudes most out of the rotor.

9. The process according to claim 1, wherein said first injection molding phase provides for the shaping of a collar which is adherent to the shaft on the side where the shaft protrudes most out of the rotor.

10. The process according to claim 9, wherein said second injection molding phase provides for the coating of said collar with said second outer protective layer and the formation of an annular seat for housing a thrust-bearing element.

11. The process according to claim 10, wherein said second injection molding phase provides for a film injection on the entire diameter of said side where the shaft protrudes most.

* * * * *